J. R. SZYMANSKE.
LUMBER HANDLING MACHINE.
APPLICATION FILED JUNE 26, 1917.
1,382,396.
Patented June 21, 1921.
11 SHEETS—SHEET 2.
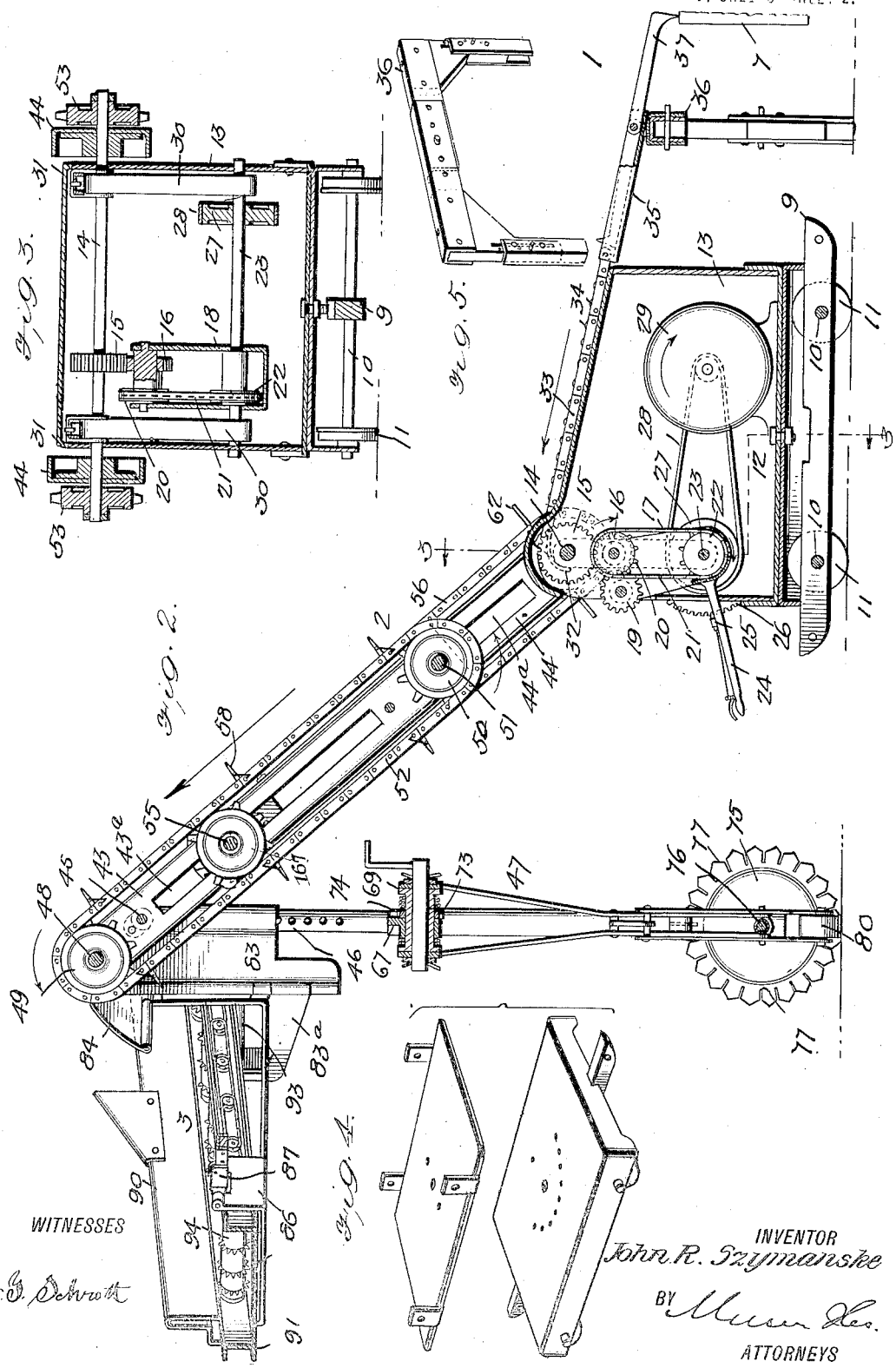
WITNESSES
J. G. Schrott
INVENTOR
John R. Szymanske
BY
ATTORNEYS

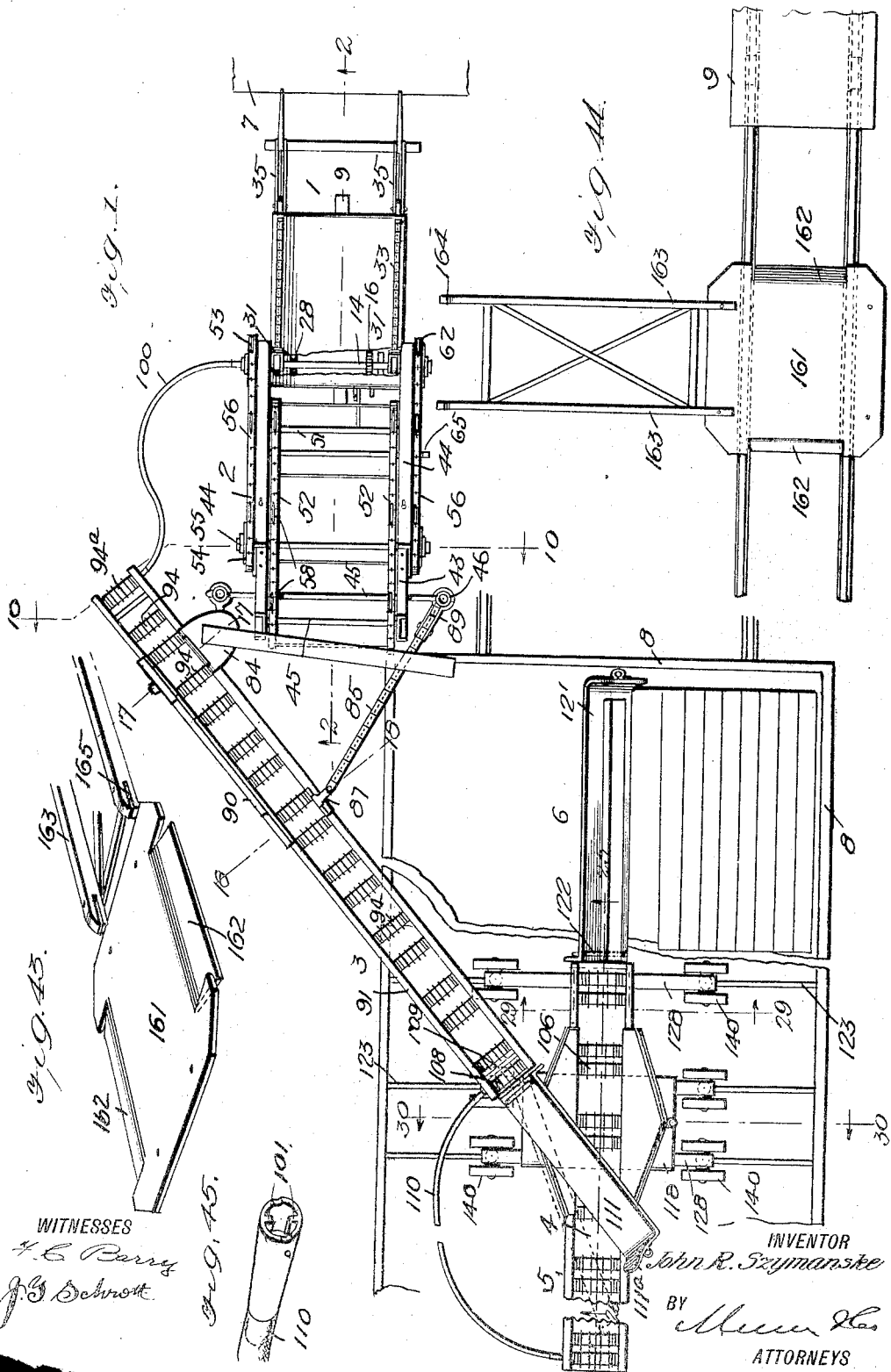

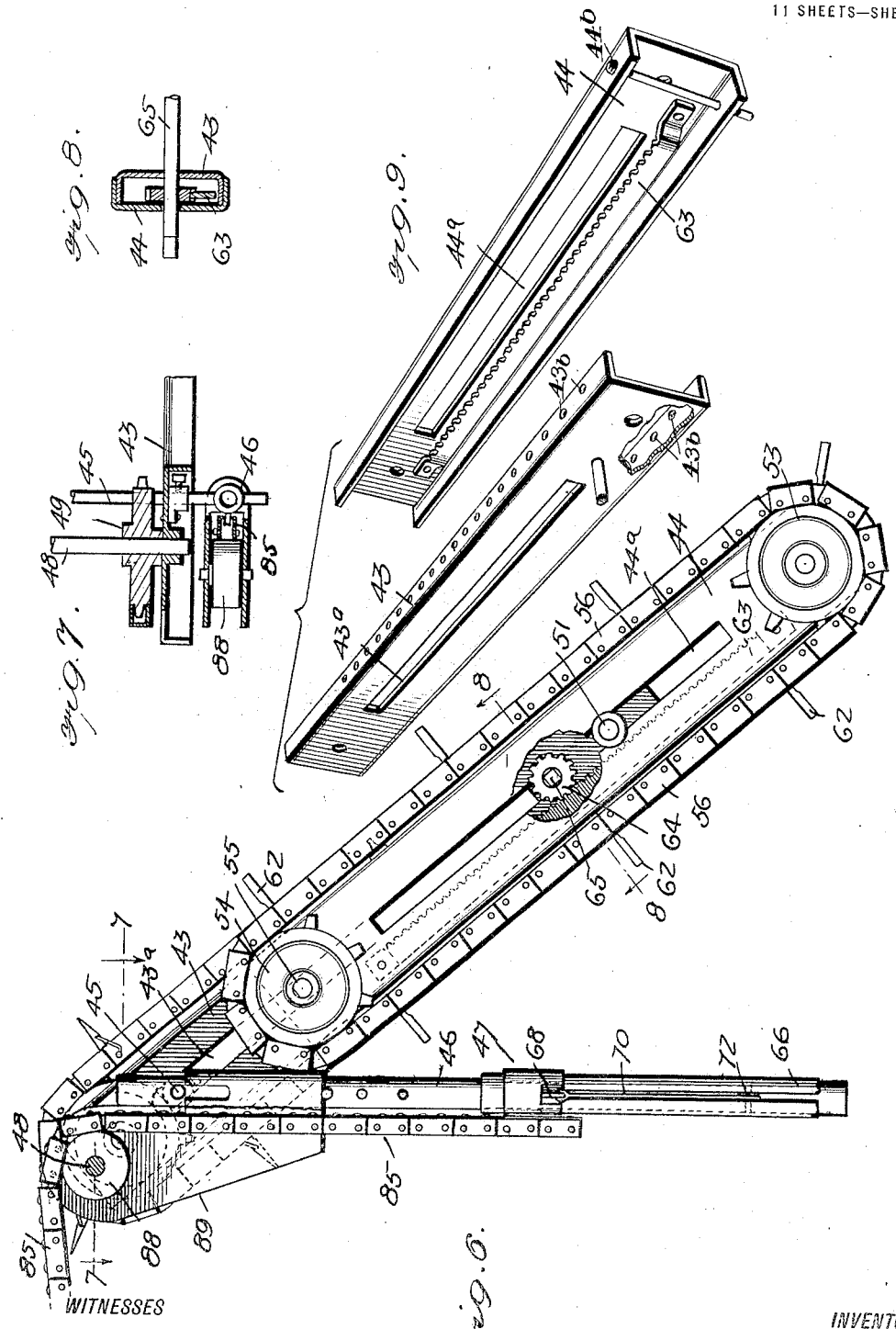

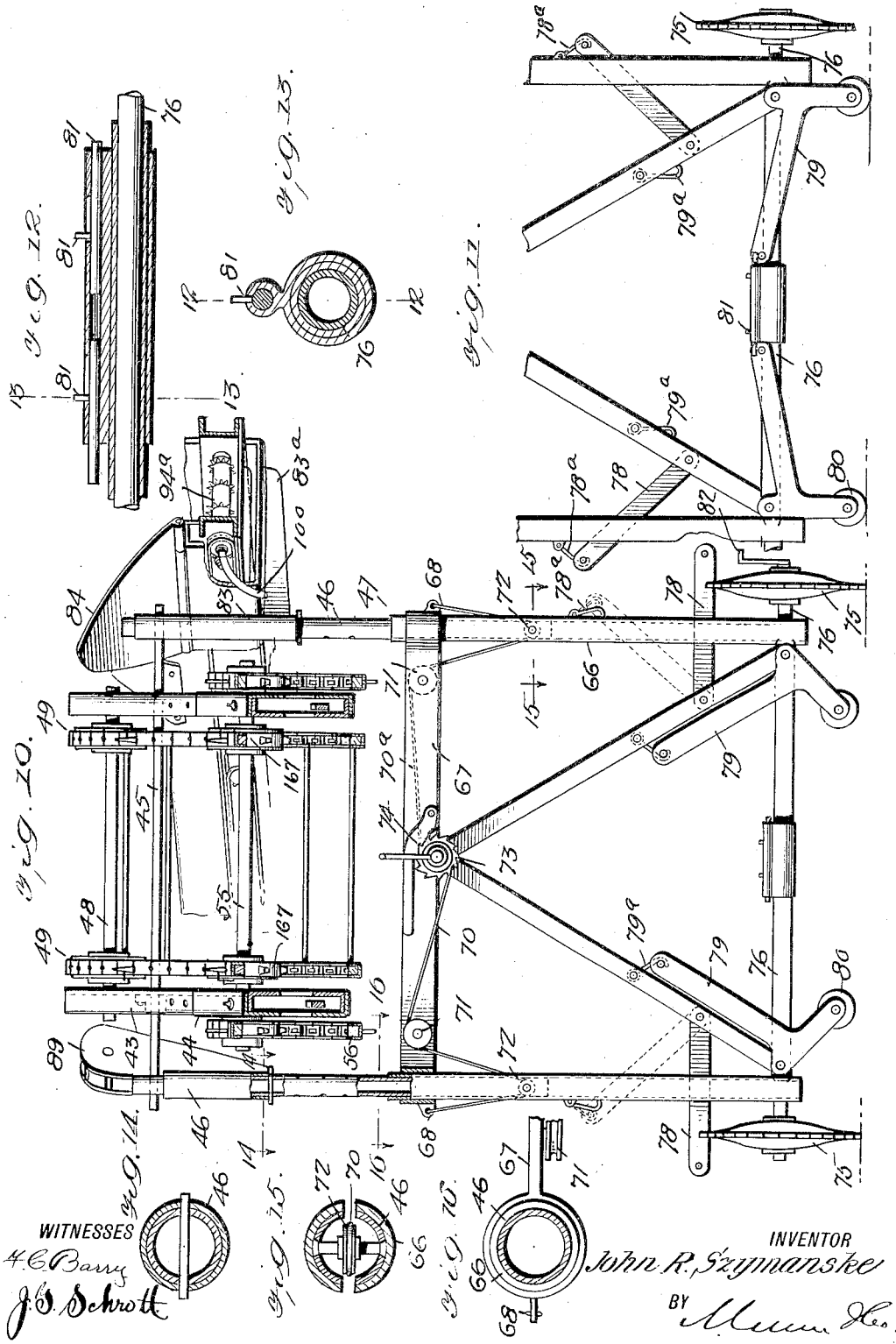

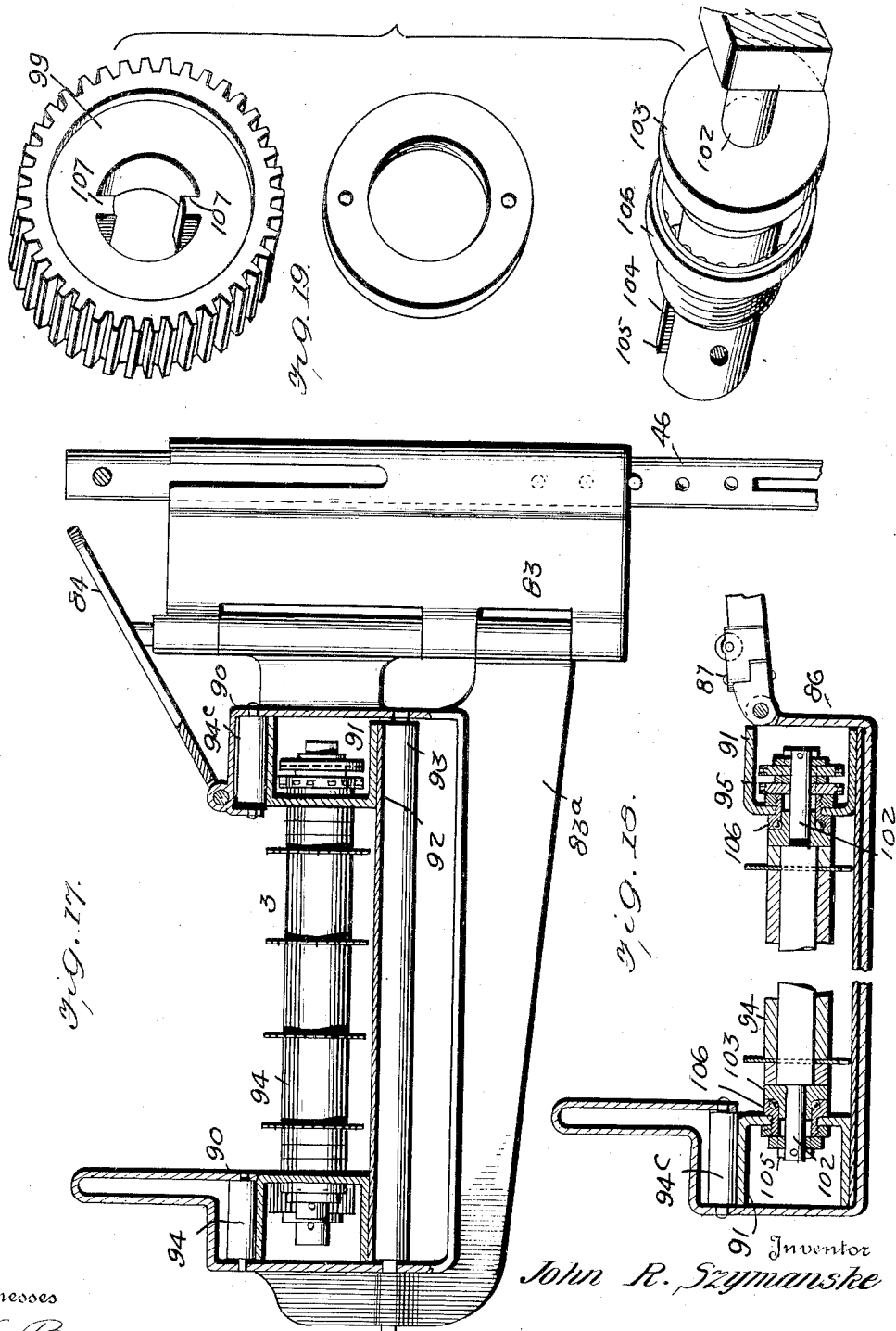

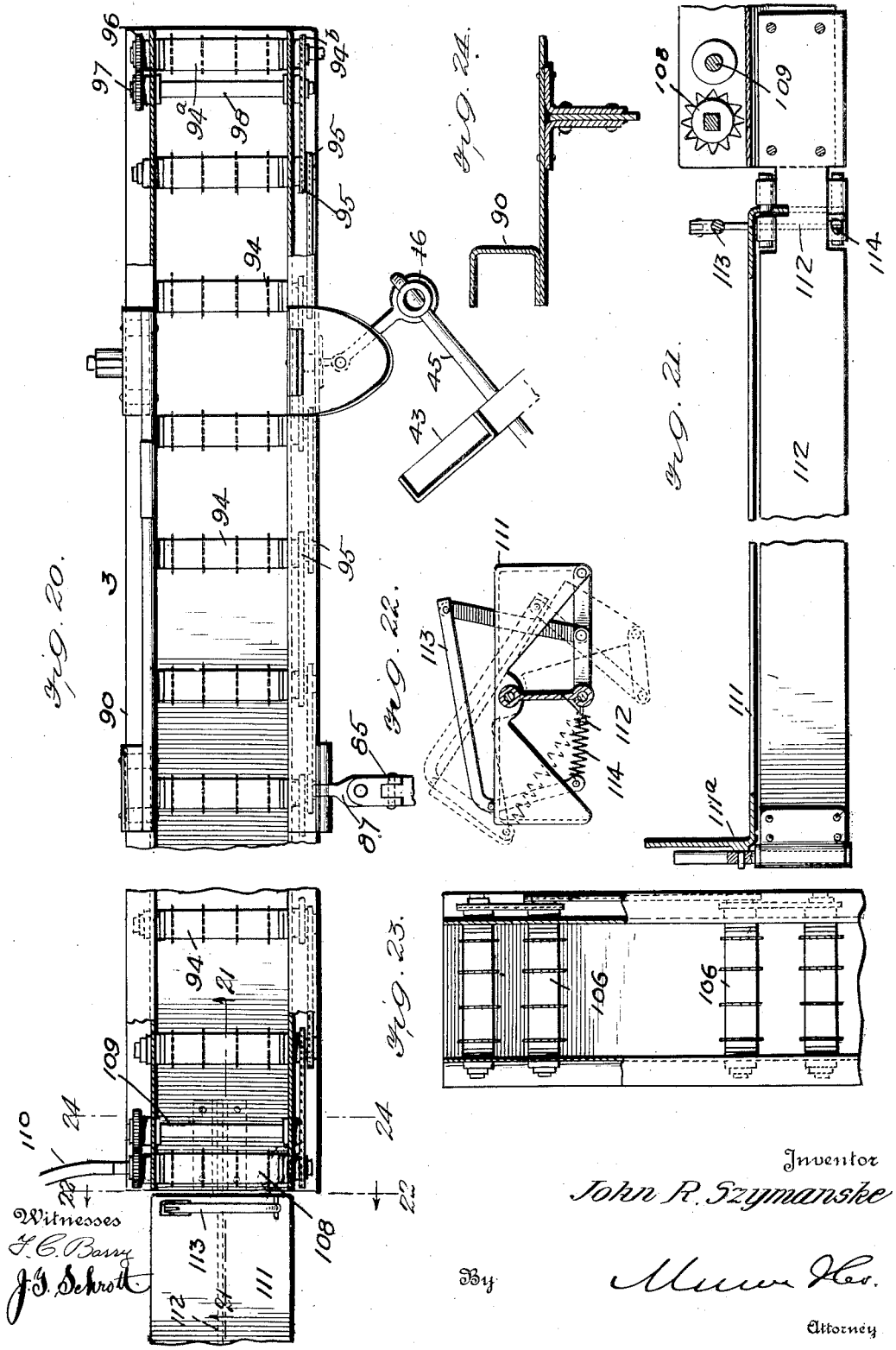

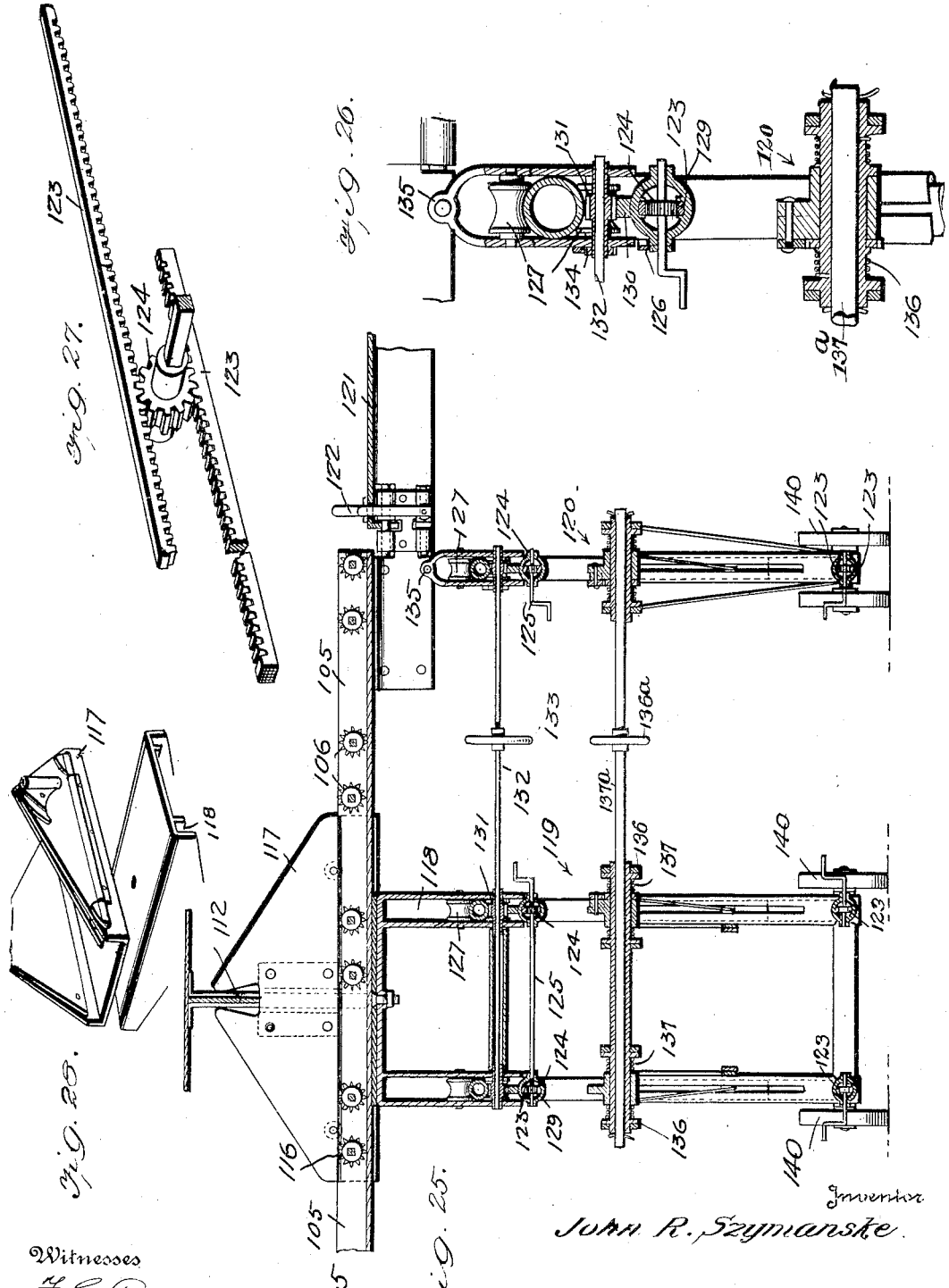

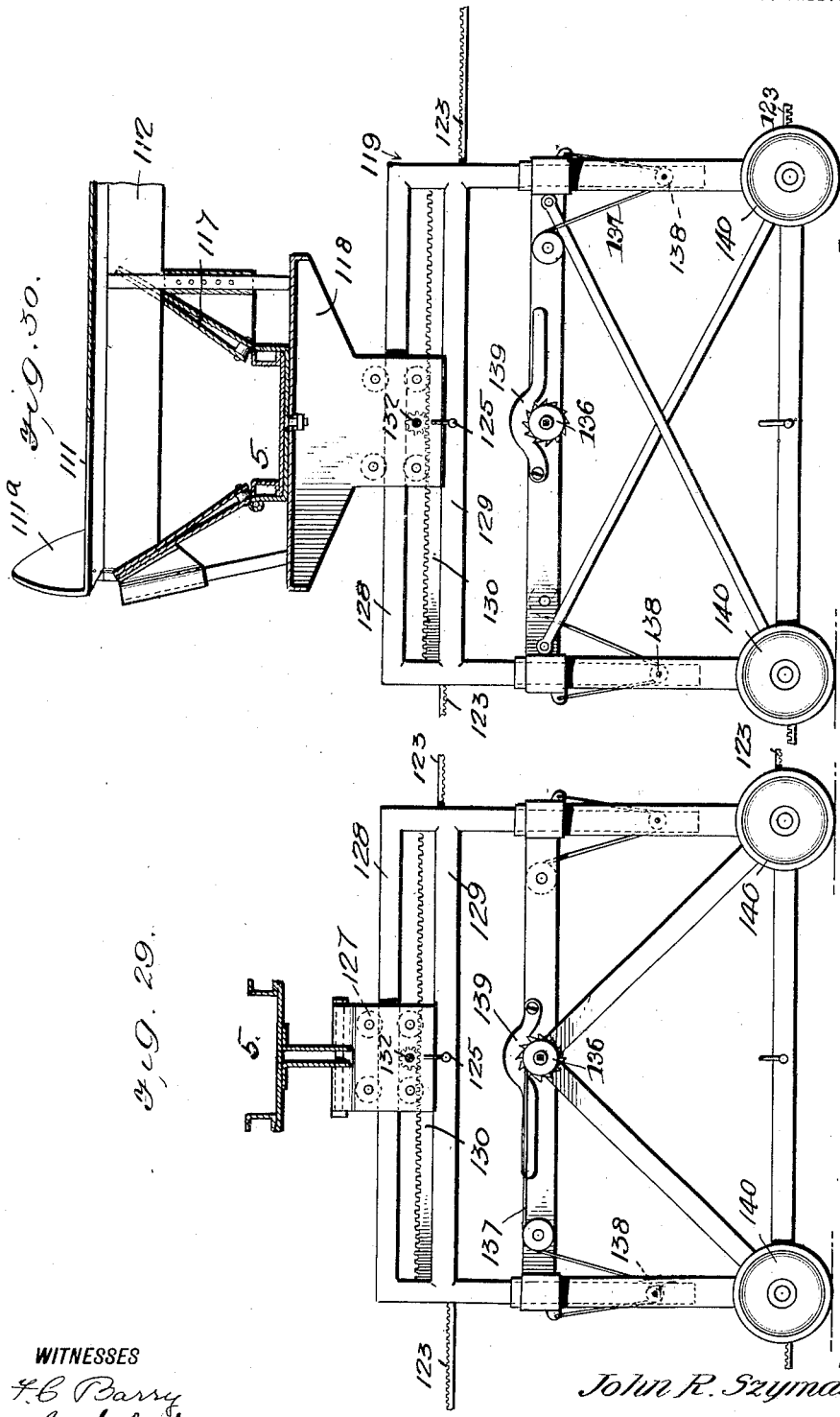

J. R. SZYMANSKE.
LUMBER HANDLING MACHINE.
APPLICATION FILED JUNE 26, 1917.
1,382,396.
Patented June 21, 1921.
11 SHEETS—SHEET 9.
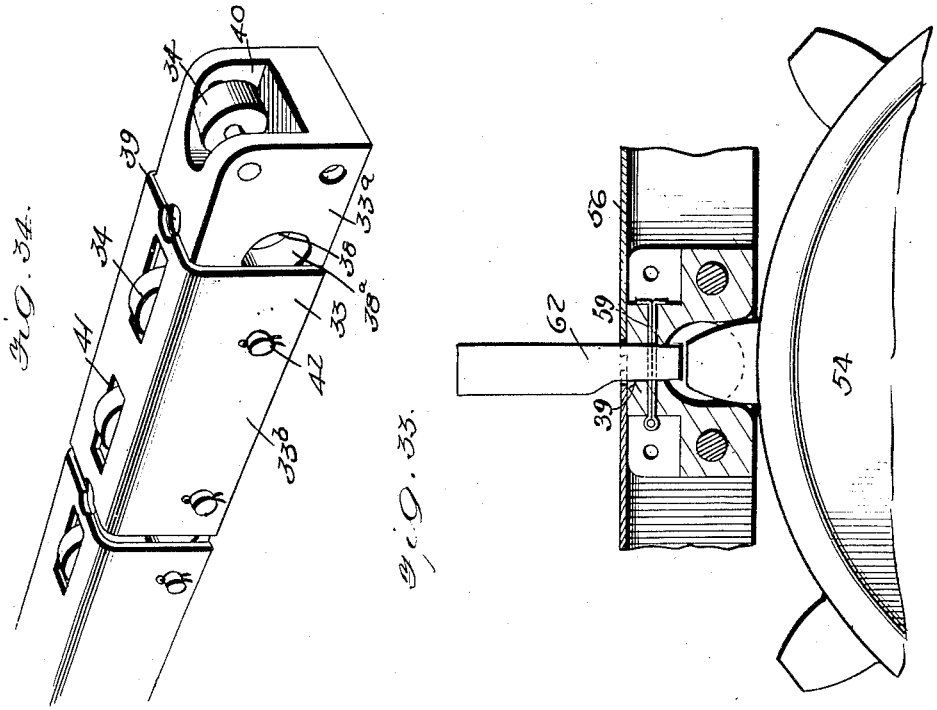
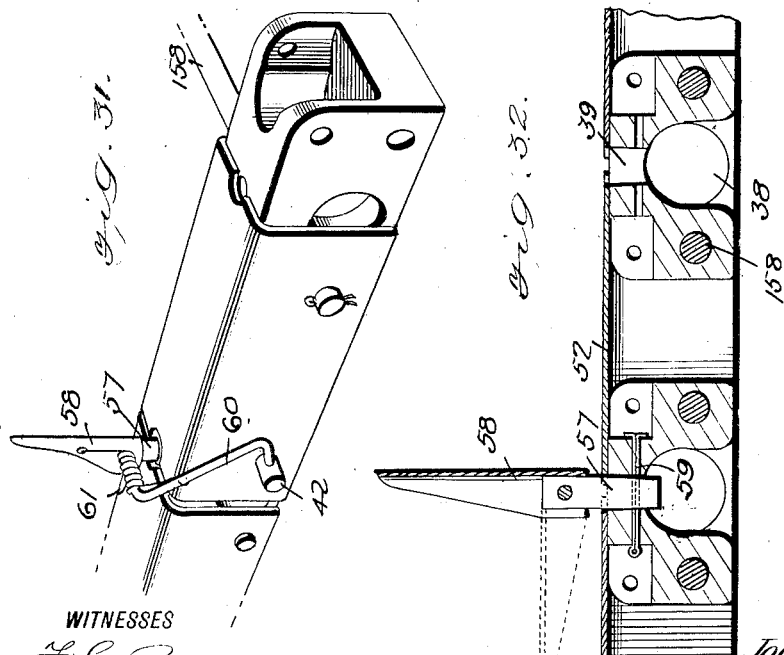
WITNESSES
INVENTOR
John R. Szymanske
BY
ATTORNEYS

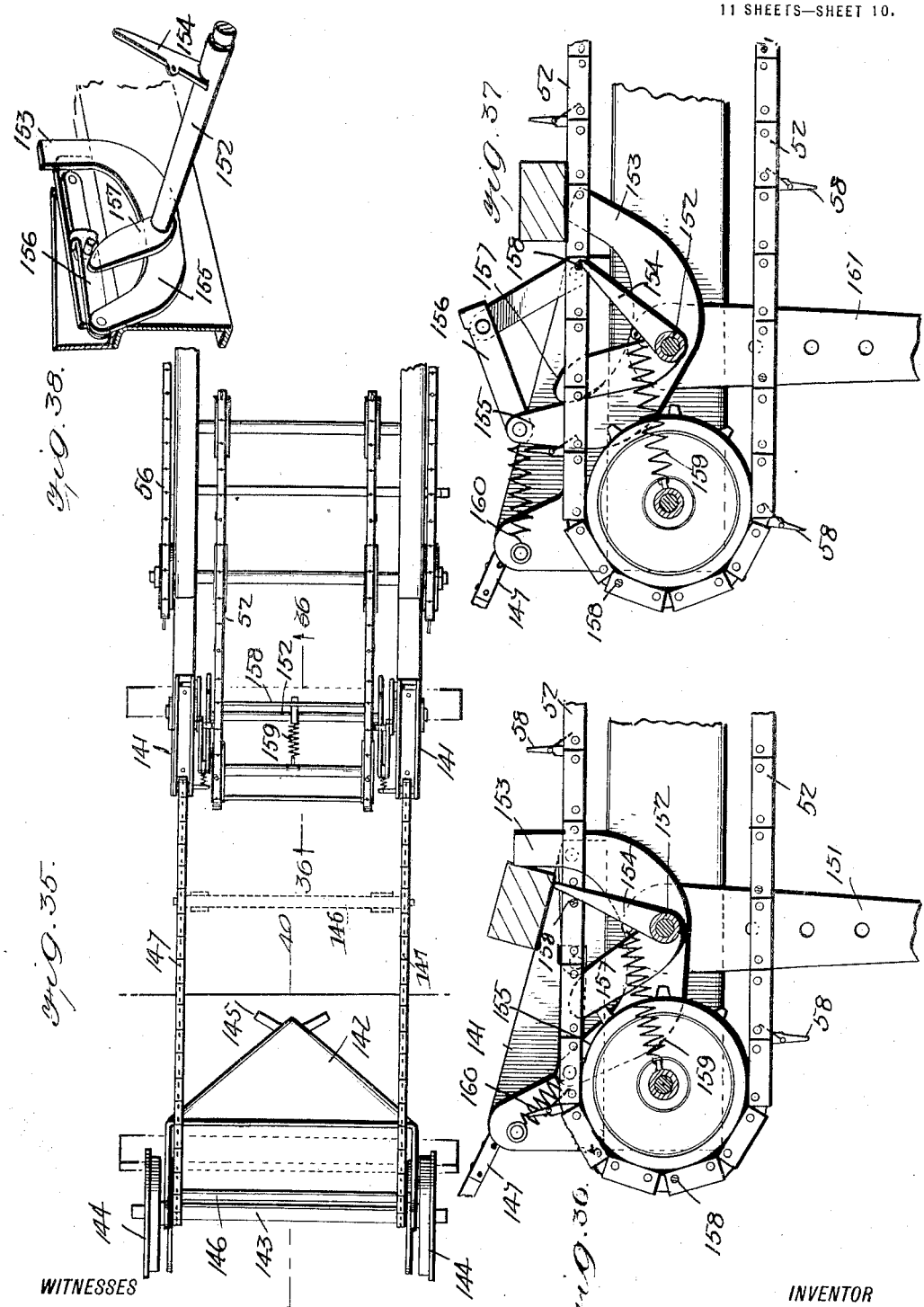

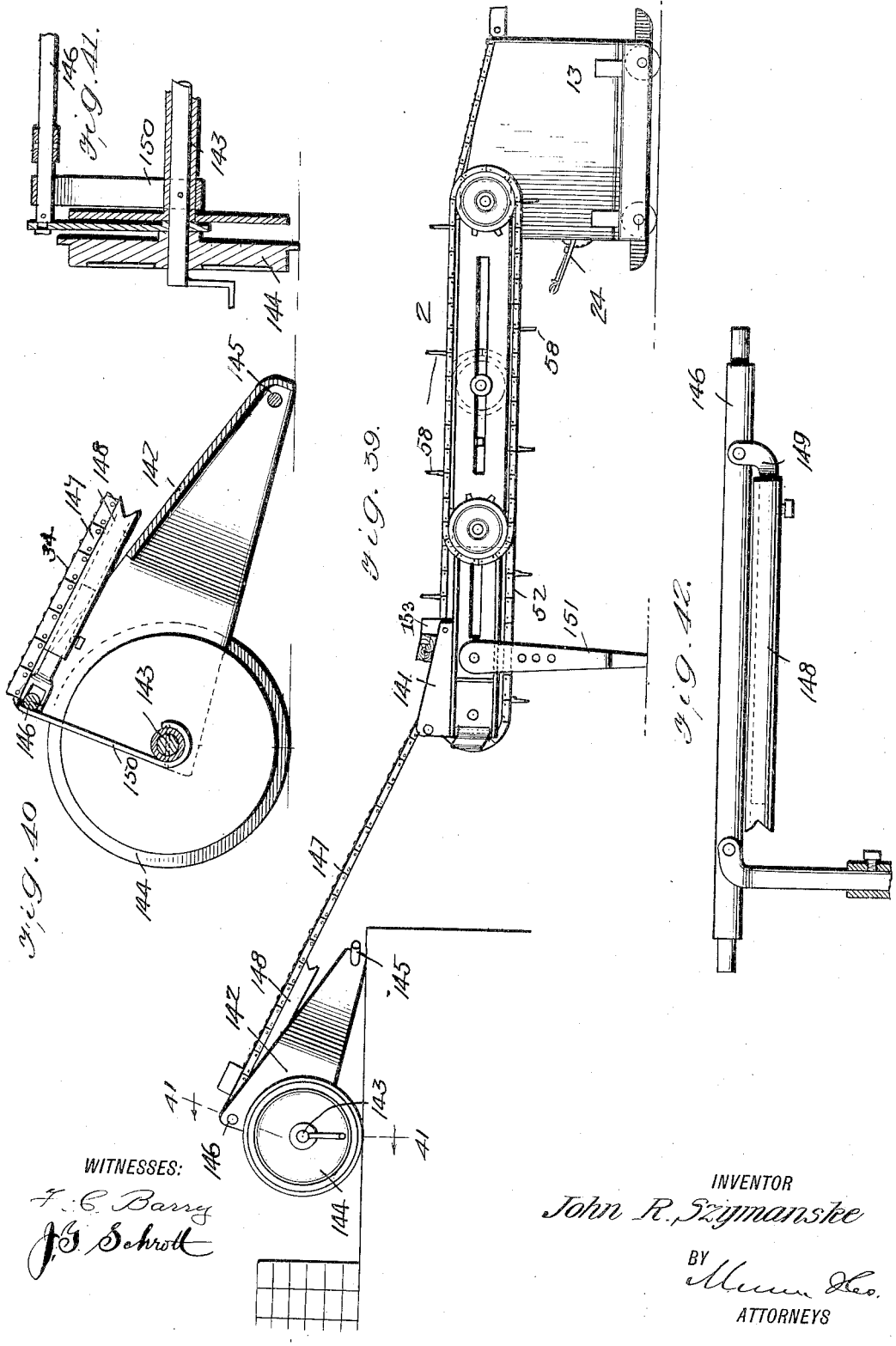

UNITED STATES PATENT OFFICE.

JOHN RAYMOND SZYMANSKE, OF SOMERS, MONTANA.

LUMBER-HANDLING MACHINE.

1,382,396.          Specification of Letters Patent.     Patented June 21, 1921.

Application filed June 26, 1917. Serial No. 177,021.

*To all whom it may concern:*

Be it known that I, JOHN R. SZYMANSKE, a citizen of the United States, and a resident of Somers, in the county of Flathead and State of Montana, have invented certain new and useful Improvements in Lumber-Handling Machines, of which the following is a specification.

My invention relates to improvements in devices for loading, unloading and piling ties, lumber, and so forth, and it consists in the combinations, constructions, and arrangements hereinafter described and claimed.

An object of my invention is to provide a machine adapted more particularly to handling railroad ties. In this branch of the lumber industry, railroad ties are handled almost exclusively by hand, and since the ties are heavy the work is slow, hard and expensive. Therefore, as has been stated, it is an object of the invention to provide a mechanically operated device, the receiving end of which is positioned adjacent to a quantity of railroad ties while the other end is positioned at a place to which it is desired to transfer the ties, as for instance, aboard a railroad car, the ties being first manually placed on the receiving end from whence they are taken up by the conveyers without further attention by the operators.

Instances may arise, as when handling railroad ties in the lumber yards that it may be desired to transfer ties from the top of a high pile to the ground. It is therefore another object of my invention to provide an auxiliary receiver to be used with a part of the machine to initially receive the ties and transport them to the conveying mechanism of the machine.

Another object of the invention is to embody features of extreme flexibility whereby the machine may be adjusted to suit varying conditions.

Another object of the invention is to provide means whereby the machine may be moved or transported from place to place.

Other objects and advantages will appear from the following specification, reference being had to the accompanying drawings forming a part thereof, in which:—

Figure 1 is a plan view of the machine, illustrating the application of the device as when it is desired to transfer a quantity of railroad ties on to a car.

Fig. 2 is a central vertical section of a portion of the device taken on the line 2—2 of Fig. 1;

Fig. 3 is a cross section on the line 3—3 of Fig. 2;

Fig. 4 is a detail perspective view of the turntable truck, hereinafter to be referred to;

Fig. 5 is a detail perspective view illustrating more particularly a portion of the adjustable frame work;

Fig. 6 is a detail side elevation of the elevator, parts being shown in section;

Fig. 7 is a cross section on the line 7—7 of Fig. 6;

Fig. 8 is a cross section on the line 8—8 of Fig. 6;

Fig. 9 is a detail perspective view of one of the elevator sides, the members being disconnected;

Fig. 10 is a cross section on line 10—10 of Fig. 1, the ground wheel being shown as locked in position;

Fig. 11 is a detail view of the lower end of the carriage support showing the ground wheel elevated from the ground, as when it is desired to transport the machine;

Fig. 12 is a detail sectional view to be referred to, the view being a cross section on the line 12—12 of Fig. 13;

Fig. 13 is a cross section on the line 13—13 of Fig. 12;

Figs. 14, 15, and 16, are detail cross sectional views on the lines 14—14, 15—15, and 16—16, respectively of Fig. 10;

Fig. 17 is an enlarged view of the swinging support taken on the line 17—17 of Fig. 1;

Fig. 18 is a cross section of the roller train on the line 18—18 of Fig. 1;

Fig. 19 is a composite perspective view illustrating more particularly the construction and method of mounting one of the roller train gears;

Fig. 20 is a detail plan view of the roller frame parts being shown broken away;

Fig. 21 is a detail cross section taken on the line 21—21 of Fig. 20;

Fig. 22 is a detail cross section of the trip device taken on the line 22—22 of Fig. 20;

Fig. 23 is a fragmentary view of the tie turner;

Fig. 24 is a detail cross section on the line 24—24 of Fig. 20;

Fig. 25 is a cross section of the tie turner taken on the line 25—25 of Fig. 1;

Fig. 26 is an enlarged detail sectional view of a portion of the device shown in Fig. 25;

Fig. 27 is a detail perspective view of one of the carriage brakes as shown in Fig. 1;

Fig. 28 is a detail perspective view of the supports and turn table of the tie turner;

Fig. 29 is a detail view of the single carriage support taken on the line 29—29 of Fig. 1;

Fig. 30 is a cross section of the double carriage support taken on the line 30—30 of Fig. 1;

Fig. 31 is a detail perspective view of a portion of the inner elevator chain;

Fig. 32 is a longitudinal section thereof showing a tooth in its collapsed position;

Fig. 33 is a detail sectional view of a portion of a sprocket and the outer elevator chain;

Fig. 34 is a detail perspective view of a portion of the receiving chain showing more particularly the anti-friction rollers;

Fig. 35 is a plan view illustrating the application of the auxiliary receiver previously referred to;

Fig. 36 is a cross section of the auxiliary receiver on the line 36—36 of Fig. 35, the parts being in a normal position;

Fig. 37 is a view similar to Fig. 36 illustrating the position of the parts after the trip mechanism has been released;

Fig. 38 is a detail perspective view of a portion of the trip mechanism;

Fig. 39 is a side elevation of the part shown in Fig. 35 illustrating the application of the auxiliary receiver to the elevator shown in Fig. 2, which elevator for the said purpose has been lowered;

Fig. 40 is a longitudinal section on the line 40—40 of Fig. 35;

Fig. 41 is a detail cross section on the line 41—41 of Fig. 39;

Fig. 42 is a plan view of a portion of the chain support for the auxiliary receiver;

Fig. 43 is a detail perspective view of a machine truck turning device, the parts being separated.

Fig. 44 is a plan view showing the application of the machine truck turning device.

Fig. 45 is a detail perspective view of a connector hereinafter referred to.

It will be observed by reference to Figs. 1 and 2 of the drawings, that in the embodiment shown therein the device includes a receiving table 1 which extends inwardly in a rearward direction and terminates at the base of the elevator 2. Coöperatively connected with the frame of the elevator 2 is a laterally extended roller frame 3, which has a primary trip 4 at one end thereof. The primary trip 4 is disposed over the tie turner 5 in such a manner that the ties after having been received at the receiving table 1, elevated by the elevator 2 and moved laterally by the roller frame 3, will be discharged on to the tie turner 5 which thrusts the ties in another direction. The ties are conveyed by the tie turner 5 to a secondary trip 6 located at the end of the tie turner 5. The secondary trip 6 operates to discharge the ties from the machine. It will be seen in Fig. 1 that the receiving table 1, is located adjacent to a pile of lumber or ties 7, while the ejecting end of the machine is in this instance located in a railroad car 8 in which the ties are to be discharged or loaded.

When the ties are to be loaded onto a railroad car, as shown in Fig. 1, the ejecting end of the machine, the construction of which will presently be more fully explained, is located centrally of the length of the car. The loading of the car is then accomplished from one end of the car back toward the place where the ejecting end of the device is situated. The tie turner 5 is then turned completely around or to an angle of 180°, and the loading of the car is similarly accomplished from the other end toward the place where the device is located.

By reference to Fig. 2, it will be observed that the device embodies a machine truck 9 which is suitably constructed of sheet metal and reinforced in any approved manner. The truck 9 carries a pair of transverse axles 10 on the ends of which wheels 11 are mounted. The machine truck 9 may be placed either on the main track or on a track adjacent to the main track, the location of the truck 9 depending on the situation of the pile of ties to be moved and loaded. Passing through the superstructure of the truck 9 is a bolt 12 which pivotally secures the bottom plate of a motor box 13 to the truck 9. The pivotal connection of the motor box 13 to the truck 9 is in the nature of a turn table connection, which offers the facility of turning the truck 9 relatively to the motor box 13 for a purpose later to be described. The motor box 13 may be partly inclosed, or it may be fully inclosed as shown in Fig. 2, and the roof of the motor box, may be said to constitute the receiving table 1.

Mounted in the upper corner of one end of the motor box 13 is a drive shaft 14. Mounted midway of the shaft 14 is a drive gear 15, with which the pinion 16 of an adjustable gear train 17, engages. The adjustable gear train or reverser 17 includes connected tie plates 18 which pivotally support the shaft of the pinion 16. Mounted on a countershaft adjacent to the pinion 16, is a reversing gear 19, which meshes with the pinion 16. Disposed on the same shaft with the pinion 16 is a sprocket 20 to which a chain 21 is applied. The chain 21 passes over another sprocket 22 on the driven shaft 23 as shown in Figs. 2 and 3, the shaft 23 forming the pivotal support for the reverser 17. By reference to Fig. 2 it will be observed that the reverser includes a lever 24 which has a suitable detent 25. Disposed adjacent to the lever 24 is a rack 26 with which the detent 25 engages, a suitable hand operated means being included whereby the detent 25 may be unlocked from the rack 26 so that the reverser 17 may be moved on its pivotal support.

A pulley 27 is also mounted on the shaft 23 and receives the belt 28 of the driving motor 29. It will be obvious from an inspection of the arrows in Fig. 2 that the gear mechanism within the motor box 13 as just described will move the elevator in an upward direction as indicated by the arrow. When, however, this portion of the device is to be used for a different purpose yet to be explained but illustrated in Fig. 39 of the drawings, it will become necessary to reverse the direction of movement of the elevator 2. In this instance the detent 25 is unlocked from the rack 26 and the lever 24 is moved upwardly, disengaging the pinion 16 from the gear 15 and bringing the pinion 19 into mesh therewith. When this is accomplished, it is apparent that the direction of movement of the elevator 2 will be reversed. The spaced relationship of the shafts 14 and 23 is assisted in being preserved by a pair of battens 30 of which there is one adjacent to each side wall of the motor box 13.

Fulcrumed on the shaft 14 and associated with each of the battens 30 is a stirrup 31. In setting up the device for operation the stirrups 31 are swung backwardly so as to admit of hooking the rounded end 32 of each of a pair of receiving chains 33 over the upper end of the battens 30 which, for this purpose are rounded as shown in Fig. 2. The stirrups 31 are simply U-shaped members which are intended to bear on the members 32 of the chains 33, and hold them in place on the rounded end of the battens 30. The chains 33 are essential to a considerable degree to the successful operation of the device. The construction of the chains 33 will presently be more fully given but it may be observed that the chains 33 differ from the chains employed in the elevator 2 in that rollers 34 are introduced, over which the railroad ties may easily be moved by the laborer.

The chains 33 lie on top of the motor box 13 as shown in Figs. 1 and 2 and each connects at its front end with a hasp 35. Each of the hasps 35 is pivoted on a supporting trestle 36, a hook 37 being suitably mounted on the pivot pin of each hasp 35, as clearly shown in Fig. 2. When the device is not in use, the hook 37 may be inclosed in its companion hasp 35, but when the device is in use, as shown in Fig. 2, the hook 37 is extended and may be driven into a suitable place of support to add rigidity to the receiving table.

By reference to Fig. 5 of the drawings, it will be observed that the trestle 36 is constructed of angle pieces in such a manner that the horizontal top and the legs may be extended for additional width and height. The construction of the trestle 36 enables the chains 33 to be raised higher than shown in the normal position indicated in Fig. 2, if it be so desired. In order that the construction of the chains 33 previously referred to as performing the particular function of a receiving chain may be fully understood at this time, attention is directed to Fig. 34 of the drawings. The chain 33 is constructed of steel links and is flexible or bendable in one direction and rigid or unyielding in the other direction. This feature of the chain is an advantage when the chain is applied to the elevator 2. A similar construction of chain embodying the same features is employed for another purpose, presently to be pointed out. The chain 33 comprises links 33$^a$ which are joined by sheath-like links 33$^b$, as shown in Fig. 34. Each link 33$^a$ is provided with a recess 38 which has lateral openings 38$^a$ toward the side of the link so that access may be had to the recess 38 for a purpose presently to appear. An aperture 39 is formed in the top of the link 33$^a$ and the aperture 39 communicates with the recess 38. The aperture 39 is slightly tapered so that when the same is used on the elevator 2, suitable elevating lugs, later to be described may be inserted in the apertures 39 and a suitable cotter pin introduced into the base of the lugs through the lateral openings 38$^a$.

The links 33$^a$ are also provided with recesses 40 at their ends for the reception of anti-friction rollers 34. The anti-friction rollers 34 project above the plane of the links 33$^b$ through suitable incisions 41. It will thus be understood that because of the flexible nature thereof, the chains 33 may be located in proper position on the receiving table so that as the logs or ties are manually conveyed thereto from the pile 7, the ties may be readily moved or slid over the rollers 34 of the chain 33 to the base of the conveyer 2. The links 33$^a$ and 33$^b$ are pivoted together as at 42, and because of the location of the pivot 42 a pressure or weight on top of the chain will effect small appreciable downward flexure of the chain. By reason of this peculiarity of the chain the support afforded by the motor box top might be dispensed with. A bending effort from beneath the chain will, however, cause the chain to yield, as for instance, when it passes around a sprocket when the chain is employed in the conveyer.

It will be seen from Figs. 1 and 2 of the drawings, that the conveyer 2 consists of a pair of side frames. Each of the side frames consists of an upper channel iron 43 and a lower channel iron 44, which telescope together for purposes of extension. The elevator 2 is supported by the shaft 14 through the medium of the channel iron 44 which at the point of connection with the shaft 14 may have a bearing boss as shown in Fig. 3. The upper ends of the side frames of the conveyer 2 are supported on a cross rod 45. By reference to Fig. 10, it will be observed that the cross rod 45 extends laterally and passes at its ends through the standards 46 of an adjustable carriage 47. Mounted in the upper ends of the side frames of the elevator 2 is a countershaft 48. A sprocket wheel 49 is mounted on each end of the shaft 48 but inside of the frame members 43 of the elevator 2. Companion sprocket wheels 50 are mounted on a shaft 51 which in turn is supported at the lower end of the channel member 43, as shown in Fig. 2. The chain 52 is applied to the sprockets 49 and 50. Located at the ends of the drive shaft 14 are other sprockets 53. It will be observed by reference to Fig. 3 of the drawings that the sprockets 53 are disposed outside of the frame members 44 of the elevator frame 2. Companion sprockets 54 are mounted on a cross shaft 55 supported at the upper end of the lower frame member 44. Since the sprocket members 54 are located outside the frame member, it follows that the shafts 51 and 55 must pass through the bodies of the frame members to permit of extending the elevator frame when extension is required.

For the purpose stated, the upper frame members 43 are provided with an elongated opening 43$^a$, while the lower frame members 44 are provided with an elongated opening 44$^a$. Chains 56 pass over the sprockets 54 as clearly shown in Fig. 6. Attention is now directed to the similarity of the conveyer chains 52 and 56 to the receiving chains 33 previously described. Reference is now directed to Fig. 32 of the drawing which is a detail view of a portion of the conveyer chains 52. It will be seen that the chains 52 include the essential features of the chain 33 with the exception that the anti-friction rollers 34 in the recess 40 are omitted. In certain ones of the tapered openings 39, shanks 57 are inserted of lifting fingers 58. The shank 57 of the lifting finger 58 is held in position by a cotter pin 59. The finger 58 is pivotally supported on the shank 57 by a fulcrum pin 60. As shown in Fig. 31 the pin 60 extends laterally at one side to form a support for a coil spring 61. The pin 60 is then bent downwardly and firmly secured to one of the link pivots or rivets 42. The purpose of the pivotal connections of the fingers 58 is to allow the fingers 58 to collapse to the dotted line position in Fig. 32 under certain conditions, while the purpose of the coil spring 61 is to retain the finger 58 normally in an erect position. This is necessary for the proper support and elevation of the ties by the elevator 2. In Fig. 33 is shown a detail view of a portion of the chain 56 which is similar in all respects to the chain 52, with the exception of the lifting finger. In this instance the lifting finger consists simply of a lug 62 having a suitably tapered face or shank for insertion in the tapered opening 39. After the ties are placed on the receiving table 1, they are moved to the base of the elevator 2 and caught up by the elevator when a pair of the lugs or lifting fingers 62 move around to remove the tie from the receiving table and the receiving chains 33. The tie is then conveyed or elevated to a place in proximity to the sprockets 54 when it will be taken up by the collapsible lifting fingers 58 and conveyed to the top of the elevator 2. The subsequent disposal of the ties will presently be described.

It is apparent that the upper and lower channel irons 43 and 44 of the frame of the conveyer 2 together with the carriage sprockets and frames form independent units which may be extended or telescoped as the condition under which the ties are being handled may make it necessary. In order to effect the extension and telescoping of the members 43 and 44 of the conveyer 2, each of the frame members 44 is provided with a rack 63, as shown in Figs. 6 and 9 of the drawings. A pinion 64 meshes with each rack 63 and is supported on a countershaft 65 which as will be seen in Fig. 8 is squared at one end for the reception of a turning crank which may be turned until the proper adjustment is reached. The adjustments of the members 43 and 44 are maintained by a locking pin 44$^b$, which is fitted into any pair of a series of apertures 43$^b$ in the flanges of the member 43.

Provision is made for the vertical adjustment of the carriage 47 as well as lateral and forward adjustment thereof. The vertical standards of the carriage consist of the members 46 which are telescoped into standards 66 as shown in Fig. 10. The adjustable carriage 47 includes an upper brace plate 67, which joins the members 66 and is provided at its ends with ears 68.

Disposed midway of the brace plate 67 is a winding drum 69 at the opposite ends of which, cables 70 and 70$^a$ are suitably secured and wound. The cables 70 and 70$^a$ are passed over sheaves 71 mounted on the brace plate 67 and then pass beneath pulleys 72 located at the lower ends of the telescoped members 46. These cables 70 and 70$^a$ then pass upwardly and are secured to the ears 68 of the brace plate 67. The winding drum 69 is provided with a ratchet 73 with which a pawl 74 coöperates. The drum 69 is provided with a suitable handle which may be turned to wind the cables 70 and 70ª on the drum to elevate the standards 46, suitable slits being provided in the member 66 to admit of the passage of the cables 70 and 70ª. The adjustable carriage 47 is mounted on ground wheels 75, which in turn are mounted on the end of an axle 76. By reference to Fig. 2, it will be observed that the peripheries of the ground wheels 75 are provided with serrations, each of which terminates in a notch 77. The purpose of the serrations is to insure a firm grip on the ground and the purpose of the notches 77 is to receive a locking member which consists of a bar or arm 78. By reference to Fig. 10 it will be seen that the bar or arm 78 is pivoted on an adjacent one of the braces of the carriage 47. When it is desired to move the carriage 47 in a manner presently to be explained, the arms 78 are disengaged from the ground wheels 75 and supported by suitable hooks 78ª, so that they may not interfere with the operation of moving the carriage. When it is desired to move the carriage 47 laterally it becomes necessary to first elevate the ground wheels 75 from the ground to the position shown in Fig. 11. For this purpose a pair of bell-cranks are fulcrumed at suitable places on the axles 76, the short arm of each bell-crank 79 bearing a ground roller 80. When the machine has been stationed at a place where lumber is to be handled the ground wheels 75 are locked as shown in Fig. 10 and the bell cranks 70 are swung up and their long arms held secured by suitable hooks 79ª. In this position the ground rollers 80 do not engage the ground. Should it become necessary to move the carriage 47, the bell cranks 79 are released and forcibly moved to the position illustrated in Fig. 11. When this position is reached the ground rollers 80 will have engaged the ground and elevated the carriage 47 and the ground wheels. In order to retain the bell cranks 79 in this position, locking bolts 81 are provided as shown in detail in Fig. 12, the locking bolts 81 engaging the ends of the bell-cranks 79 in a suitable manner to prevent the rollers 80 from slipping beneath the carriage. Should it be desired to move the carriage 47 backward or forward over the ground as when the ground wheels 75 are in contact therewith, it is only necessary to release the ground wheels and turn the axle 76 through the medium of a suitably provided crank 82 on one end thereof.

Mounted on the suitably arranged shaft 55 journaled on the frame of the carriage 2, is a pair of sprocket wheels 167 as shown in Figs. 2 and 10. These sprocket wheels 167 engage the chains 52 of the upper conveyer section so that the motion of the lower chains may be imparted thereto. This arrangement is necessary since, as stated, the two conveyer sections are independent units and the employment of the sprockets 167 is required. The shaft 55 becomes the driving shaft for the upper conveyer chains by reason of the chain connection 56 in Fig. 1.

It has been stated that the ties are conveyed by the elevator until they reach the upper end thereof, where they are discharged. The ties are discharged from the conveyer 2 onto a roller frame 3. It will be observed by reference to Fig. 1 of the drawings, that the roller frame 3 extends at an angle to the elevator 2. The roller frame 3 may however, be disposed at any desired angle in a horizontal plane. The roller frame is sustained from one of the standard members 46 by a swinging support 83. The swinging support 83 is in the nature of a hinge and includes a casting 83ª which forms the principal support for the near end of the roller frame as shown in Fig. 17. The casting 83ª includes a catcher plate 84 which is disposed in such a position as to catch or receive one end of the tie as it is discharged from the elevator 2 as shown in Fig. 1. The other end of the tie is supported by a supporting chain 85 and this chain 85 is constructed precisely as is the chain 33 shown in Figs. 1 and 34, that is to say, it includes the anti-friction rollers over which the opposite end of the tie may slide with little resistance. One end of the chain 85 has a swivel connection with the roller frame 3, which for this purpose is provided with a bracket 86 which terminates in a hinge joint, as shown in Fig. 2 through which the coupling member 87 of the chain 85 is connected. The other end of the chain 85 passes over a suitable support which may be in the nature of a sheave 88. The sheave 88 is supported in a chain guard 89 which is mounted on the opposite one of the standards 46 to which the frame support 83 is mounted. In this embodiment, the rigid feature of the chain as mentioned in the description of the chain 33 will again manifest its advantages. If the chain 85 were flexible throughout its length, it would be necessary to secure both ends thereof in some manner to prevent the weight of the tie from drawing the same out of the chain guard 89. However since the chain is proof against flexure in a downward direction, the weight of the end of the tie will serve only to increase its rigidity. The then natural tendency to withdraw the chain from the chain guard 89 will only serve to stiffen the free or loose end of the chain which will then engage the adjacent standards 46 and act as a brace against the withdrawal of the chain.

The roller frame 3 also embodies the feature of extensibility and to further this feature, the casting 83ª shown in Fig. 17 may be formed with a housing 90, this housing also being clearly shown in Fig. 1. Slidable within the housing 90 and supported thereby, are the channel iron side members 91 of the roller frame 3. As will be seen from Fig. 17 of the drawings, the roller frame 3 includes a bottom plate 92 which may extend the whole length of the roller frame if necessary and joins the channel iron members 91. The bottom plate 92 rests on transverse supporting rollers 93, which are equal in length to the width of the extensible roller frame 3. Shorter rollers 94ᶜ shown in Fig. 17 engage the top of the channel iron 91 and perform the combined function of keeping the extensible member in place and reducing friction when the extensible member is drawn out or moved in. The roller frame 3 includes a series of spiked rollers 94 which as shown in Fig. 20 are placed equal distances apart, the placing of the rollers however, being optional. Each of the spiked rollers 94 is provided at one end with a pair of sprockets 95 which, as indicated in Fig. 20, receive a chain which may be an ordinary bicycle chain. It will be seen that the chains are applied to the companion sprockets of adjacent rollers 94 so that the initially applied rotary movement may be transferred to these rollers 94 and convey the ties to the end or place of discharge of the roller frame 3.

Motion is imparted to the rollers 94 from a master roller 94ª. It will be seen in Fig. 20 that the master roller 94ª is provided with a gear 96 at one end, meshing with a similar gear 97 on a countershaft 98. It will be observed that the opposite end of the roller 94ª is provided with a sprocket 94ᵇ. The sprocket 94ᵇ is similar in construction to that of a gear 99 illustrated in Fig. 19, and hereinafter to be described. The master roller 94ª is driven by a flexible shaft 100 from any of the rotating shafts of the conveyer 2. By reference to Fig. 1 it will be seen that the flexible shaft 100 is connected to the drive shaft 14. The construction of the ends of the flexible shaft 100 is shown more clearly in Fig. 45. From this figure, it will be seen that each end of the flexible shaft is provided with a plug having a receptacle and suitable ears 101, which will firmly engage the sprocket 94ᵇ when the flexible shaft 100 is "plugged" therewith, as shown in Figs. 1 and 10. The end of the countershaft 98 is also suitably shaped to receive the plug of the flexible shaft 100, so that if it is desired to reverse the direction of rotation of the spiked rollers 94, the plug of the flexible shaft may be removed from the sprocket 94ᵇ and inserted in the end of the countershaft 98. It will thus be readily seen that the direction of rotation of the rollers will be reversed by reason of the operation of the intermeshing gears 97 and 96.

The construction of the gear 99 illustrated in Fig. 19 and previously referred to, is typical of the construction of all of the gears and sprockets employed in the device particularly in the roller frame 3 and in the tie turner 5. By reference to Fig. 18 it will be seen that the shaft of each roller 94 includes a reduced end 102 on which a bearing cone 103 is mounted and secured. Each bearing cone 103 has an extension in the nature of a stud 104 which as shown at the lower portion of Fig. 19 is slotted at 105. Co-acting bearing cones 106 are threaded into suitable openings in the channel iron members 91 of the roller frame 3, as shown in Fig. 18, anti-friction rollers being introduced between the two cones. It will be observed that the gear 99 is provided with suitable lips or projections 107. When the device is assembled as shown in Fig. 18, the lips 107 of which similar ones are provided on the sprockets 95 are slipped into the recess 104, suitable washers, check nuts, and cotter pins being employed to retain the sprocket 95 in position. It will be seen from Figs. 2 and 17, that the far wall of the housing 90 extends upwardly a considerable distance. The purpose of this construction is to form a guard rail to check the momentum of a tie should it be discharged from the conveyer 2 with excessive velocity.

It will be observed in Fig. 20 that the opposite end of the roller frame 3 is constructed somewhat similarly to the end just described, in that the master roller 94ª has its counterpart in the roller 108, and the countershaft 98 has its counterpart in the countershaft 109. Rotational motion is transferred from the roller 108 or the countershaft 109 through the roller of the tie turner 5, by a flexible shaft 110.

The ties having been conveyed over the length of the roller frame 3, by the spiked rollers 94, are transferred, as has been pointed out, to the tie turner 5 by a primary trip 4. The trip 4 includes a tilting platform 111, which is fulcrumed on a suitable support 112 which is an extension of the frame work of the roller frame 3. By reference to Fig. 22 it will be observed that the primary trip 4 also includes a platform trip 113, which works in conjunction with the tilting platform 111. The tilting platform 111 normally rests in a horizontal position and as shown in Fig. 1 is provided at one end with an abutment 111ª, which prevents the tie from being projected off of the table 111 when it is discharged from the roller frame 3. The platform trip 113 includes an arrangement of levers 113ª and 113ᵇ which are assisted by a tension spring 114 in maintaining the horizontal position of the tilting platform 111. When a tie is entirely ejected from the roller frame 3, as shown in Fig. 21, that end of the tie nearest to the frame 3, will fall on the adjacent top member of the platform trip 113. The weight of the end of the tie will cause the lever connections to be broken so that they move in the position shown in dotted lines in Fig. 22 when the tilting platform will be rocked on its fulcrum and the tie discharged onto the tie turner 5. It will be observed that in order to prevent the premature operation of the platform trip 113, this portion of the mechanism is located sufficiently lower than the rollers of the roller frame 3, so that the entire length of the tie may be projected onto the tilting platform 111 before the trip 113 is operated. It is obvious that as soon as the tilting platform 111 is relieved of the weight of the tie, that the tension spring 114 will restore the tilting platform and its coacting platform trip 113 to the normal position, shown in Fig. 22.

The tie having been discharged from the roller frame 3, as just described, will fall into the trough of the tie turner 5, by which the direction of travel is changed and subsequently is deposited at the desired place. The tie turner 5 is substantially like the roller frame 3, and consists of a trough 115 in which like rollers 116 are rotatably mounted. As will be seen in Fig. 23, the construction and method of rotating the rollers 116 is similar to that of the rollers 94 of the roller frame 3, with the possible exception, that in the present instance the rollers 116 should be arranged in pairs. This arrangement, however, also being optional.

The trough 115 of the tie turner 5 is supported in a turn table housing 117. The sides of the housing are flared as shown in Figs. 1 and 28 of the drawings, this construction having the twofold purpose of providing an ample support for the housing 117, and providing a guard to catch the tie as it is discharged from the tilting table 111. The housing 117 is rotatably supported on the turn table base 118 of a double carriage support 119 as clearly shown in Figs. 25 and 30 of the drawings. The purpose of a turn table at this particular place is to permit the trough 115 of the tie turner 5 to be swung completely around through an arc of 180° when one end of the railroad car is loaded with ties. One end of the car having been loaded, the turn mechanism is turned around as just stated, and the opposite end of the car is then loaded. By reference to Fig. 25, it will be seen that the forward end of the tie turning mechanism is supported by a single carriage support 120. The secondary trip 6, previously referred to, is disposed at the discharge end of the tie turner 5, as shown in Figs. 1 and 25. The trip 6 comprises a tilting table 121 and a table trip mechanism 122, both being similar in construction and operation to the platform 111 and the trip 113. The tie having reached the ends of the trough 115 is projected on to the normally horizontal platform 121 which is subsequently tilted by the operation of the trip 122 by the weight of the tie thereon. The operation of tripping the platform 121 is repeated by each tie, so that the ties are thrown in a uniform pile into the car 8 as shown in Fig. 1. As the pile grows at the side of the car, the turning mechanism and its associated parts is moved over so that subsequently received ties may be discharged at the base of the pile and fill up the end of the car.

It has been stated that the double carriage support and single carriage support 119 and 120 respectively, are located centrally of the length of the car in the first instance. The carriages 119 and 120 are held in position by locking braces 123 one of which is shown in detail in Fig. 27. Each member of the locking brace is provided with a rack with which a pinion 124 engages. The pinions 124 of the double carriage support 119 are joined by a common crank rod 125, while the pinion 124 of the single carriage support 120 is provided with a single crank rod. It will be obvious that when the pinions 124 are rotated that the locking braces 123 will be projected in opposite directions, the rotation of the pinions 124 continuing until the ends of the locking braces 123 reach the sides of the car, as shown in Fig. 1. A suitable locking pawl and ratchet device 126 may be provided as shown in Figs. 26, 29 and 30 so that when the locking braces 123 are once adjusted they may be held in said position.

It has been stated that for the purpose of filling the end of the car 8, the trough 115 and its associated parts may be shifted bodily. By reference to Figs. 29 and 30 it will be observed that suitable rollers 127 are embodied in the supporting frame work of each of the carriages 119 and 120 as shown more clearly in Fig. 25, these rollers 127 being supported by the upper tubular members 128 of the respective carriages. It has been stated that the locking braces 123 are in each instance inclosed in a tubular portion 129 just beneath the upper tubular portion 128. A rack 130 is formed in any suitable manner on top of the tubular portion 129, as shown, and a pinion 131 engages each of the racks. Each pinion 131, has a shaft extension at each side as shown in Fig. 26, these shaft extensions having a square longitudinal opening for the reception of a common turning rod 132. The turning rod 132 is provided with a hand wheel 133, as shown in Fig. 25, so that by turning the wheel 133 each of the pinions 131 is rotated and the trough 115 and its associated parts moved laterally in the direction desired. One of the shaft extensions of each of the pinions 131 may be provided with a pawl and ratchet device 134 by means of which the parts may be retained in their set position.

It will be seen in Figs. 25 and 26, that the single carriage support 120 is connected to the end of the trough structure 115, by a pin 135. When it becomes necessary to turn the trough around, as has been pointed out, it will also become necessary to transfer the support 120 to the other end of the car. This may readily be done by removing the pin 135 and releasing the turning rod 132 from the pinion 131 when the trough 115 may be turned and the carriage support 120 transferred to the other end of the car as stated. The double carriage support 119, however, remains in the one position until the car is entirely loaded when it too is released and removed. The carriages 119 and 120 may be elevated in unison by turning the hand-wheel 136ᵃ of a shaft 137ᵃ common to both carriages, as clearly shown in Fig. 25.

The carriages 119 and 120 are constructed of telescopic members similarly as the standards of the adjustable carriage supports 47 are constructed. The frame members of these carriages may be adjusted vertically by devices which briefly stated consist of winding drums 136 which have cables 137 passing over the housing at the lower end of the telescoped portion of the carriage frame members as clearly shown in Fig. 29. A suitable pawl and ratchet device 139 locks each winding drum 136 in position. The carriages 119 and 120 are mounted upon floor wheels 140 by means of which the carriages may be readily transported. The general arrangement of the device as described thus far is that when the device is used for piling lumber or transferring it from a low to a high place. Although it has been stated that the device is used principally in handling railroad ties, it is obvious that the device is adaptable to handling a great variety of materials. The device is also adaptable to handling lumber, as for instance, when it is desired to move a pile of lumber or ties from one place to another. Such an embodiment of the device is illustrated in Fig. 39 of the drawings, from which it will be observed that the tie turner 5, the roller frame 3, and the adjustable carriage supports 47 are entirely omitted. Auxiliary support 141 is substituted for the carriage support 47 and the auxiliary support 141 includes stop and trip mechanisms presently to be more fully explained. Associated with the auxiliary support 141 is an auxiliary receiver 142. The auxiliary receiver 142 consists preferably of a sheet metal body which supports an axle 143 at one end, at the ends of which wheels 144 are mounted. The wheels 144 may be flanged as illustrated in Fig. 41, or they may be plain, the advantage of the flanged wheels, however, is that the auxiliary receiver 142 may be mounted on a railroad track and the receiver moved to a place from whence it may be desired to remove a quantity of lumber. The auxiliary receiver 142 is provided with handles 145 at the front end as shown in Figs. 35 and 39 which may be grasped to convey the receiver from place to place.

A brace rod 146 is mounted in the upper corner of the receiver 143 as shown in Fig. 40. The brace rod 146 forms the supporting member for a pair of auxiliary receiving chains 147. It should be noted that these receiving chains 147 are of a similar construction to the receiving chain 33 illustrated in Figs. 1 and 34, in that the anti-friction rollers 34 are included, so that a tie, when placed on the auxiliary receiver chain 147, may readily slide to the receiving end of the conveyer 2, as indicated in Fig. 39. The advantage of the rigid feature of the receiver chain will again be apparent, since a tie being placed on the receiver chain will move thereover, and cause comparatively little flexure of the chain. In such instances where the chain 147 may be of great length, it may be advisable to employ the telescopic supports 148 shown in Fig. 39.

The telescopic supports 148 consist of an outer tubular member and an inner tubular member 149 which is pivoted to the brace rod 146 and illustrated in Fig. 42. This pivotal connection permits horizontal swinging of the telescopic member but in practice is rigid enough to support the weight above when extended as in Fig. 40. The brace members 146 may also be employed midway of the chains 147, somewhat as indicated in dotted lines in Fig. 35. In this instance the brace members are arranged beneath the chains 147 and support the chains from sagging. The outer member 148 may be moved outwardly under the chain 147 to any desired distance, and locked in position by a suitably provided set screw. When the device is assembled the chain 147 is laid over the support 146 and hooked under the axle 143 for which purpose the chain 147 is provided with a hook 150. The opposite ends of the chains are anchored on the auxiliary support 141, as shown in Figs. 36 and 39.

Each auxiliary support 141 includes supporting legs 151, the legs 151 being supported on a shaft 152 which also acts as the fulcrum for the tie stops 153 and a trip 154. (See Fig. 36.) The tie stops 153 extend beyond their fulcrum points on the shaft 152, as at 155.

A jointed arm 156 is pivoted to the ends 155 of the stops 153, and to an immovable part of the support 141. The trip 154 includes a lifter 157, which when the parts are in a level position as shown in Fig. 36, rests in proximity to the joint of the arm 156. The inner conveyer chains 52 are provided at intervals with transverse trip rods 158 which also perform the function of brace and spacing members. It should be observed that the trip rods 158 are set a short distance in back of the fingers 58 so as to release the trip 154 just after one of the fingers 58 has passed under the tie.

When a tie is now lifted onto the auxiliary receiver chain 147, the tie rapidly slides down the chain being received by the auxiliary suport 141 where it is checked by the then rigid stop 153. The use of the stop 153 is necessary especially in instances where the receiver chain 147 is long. If it were not for the stop 153, there would be nothing to check the momentum of the tie, which might strike the fingers 58, break them off and possibly do other damage. The tie having reached the stop 153 comes momentarily to rest until one of the trip rods 158 reaches the trip 154. The trip 154 is then rocked on its fulcrum causing the lifter 157 to rise and "break" the joint of the arm 156. The joint of the arm 156 having been "broken" the ends 153 of the tie stop will begin to descend by the pressure of the weight of the tie while the ends 155 will begin to ascend. As soon as the tie touches the conveyer chain 52 the tie will again continue its forward travel by reason of the forward movement of the chain 52. It should be observed that in the present instance, the lever 24 (see Fig. 2) has been operated to move the gear 19 into engagement with the gear 15 so that the direction of the movement of the conveyer chain is reversed. The tie now being fully placed on the conveyer chain will move forwardly until it reaches the chains 33 at the receiving table 1, over which the ties will move to be received and taken off. Should a tie reach the stop 153 just before one of the fingers 58 passes that place, these fingers 58 will strike the bottom of the tie and collapse to the dotted line position in Fig. 32 thereby doing no damage to the finger. Tension springs 159 and 160 are employed in connection with the trip arm 154 and the stop 153 respectively, for the purpose of returning these parts to their normal positions.

It has been stated that the truck 9 may be mounted either on the main line track or on a line adjacent thereto. In Figs. 43 and 44 of the drawings, I have illustrated a simple device for removing the truck from the track so as to clear the track, so as to either allow cars to pass or to move another car into position for unloading. This device consists simply of a plate of sheet metal 161 from which flanged portions 162 are bent downwardly so as to fit between the rails, as shown in Fig. 44. A section of portable track 163 is laid down beside the main track at right angles thereto.

The ends of the track section 163 are bent or curved upwardly as at 164 to act as bumpers or stops. The opposite ends of the portable track sections 163 are provided with kerfs 165 into which one edge of the plate 161 fits and is secured by suitable means as shown in Fig. 44. The device being in position (it being desired to remove the truck 9 from the track), the truck 9 is pushed up on the flat plate 161, turned around, and pushed out on the portable track 163, far enough to clear the main track. The fastening pins are then taken from the ends of the rails 163, the plate 161 moved, and the car shifted along the track as the occasion may require.

While the construction of the device as described is that of a preferred form, it is obvious that numerous variations may be made without departing from the spirit of the invention or the scope of the claims.

I claim—

1. A lumber handling device, including a tie receiving table, anti-friction chain tie supports resting on said table, and means located independently of the table for sustaining portions of said chain supports, and enabling adjustment thereof.

2. In a lumber handling device; a tie receiving table; a mechanically operated elevator for removing the ties from the table, a roller frame associated with the conveyer for receiving the ties and transferring them in a lateral direction, and a tie turner associated with the end of the roller frame for receiving the ties and transferring them in another direction.

3. In a lumber handling device; a tie receiving table, a mechanically operated elevator for removing ties from the table, a roller frame for receiving the ties and transferring them in a lateral direction, a primary trip to which the roller frame delivers, a tie turner arranged to receive the ties from the trip, and a secondary trip coöperative with the tie turner for receiving and dumping the ties.

4. In a lumber handling device; an elevator, an elevator support, consisting of inner and outer telescoping members, an axle supported at the lower ends of the outer member, ground wheels mounted on the ends of the axle and having notched peripheries, an arm for locking the ground wheels in position, and means for raising the wheels from the ground.

5. In a lumber handling device; an elevator, an elevator support, consisting of inner and outer telescoping members, an axle supported at the lower ends of the outer members, ground wheels mounted on the ends of the axle and having notched peripheries, bell-cranks having long and short arms fulcrumed on the axle, and ground rollers mounted on the short arms the rollers being forced into engagement with the ground through the medium of the long arms to raise the ground wheels.

6. In a lumber handling device; an elevator, a roller frame disposed adjacent to the discharge end of the elevator and having a pivotal bearing on the elevator support, a catcher plate for receiving one end of the tie, and a sustaining chain between the roller frame and the conveyer support for receiving the other end of the tie.

7. In a lumber handling device; a tie receiving table, an elevator, a roller frame disposed adjacent to the discharge end of the elevator and having a pivotal bearing on the elevator support, a catcher plate for receiving one end of the tie, a sustaining chain between the roller frame and the conveyer support for receiving the other end of the tie, and a flexible driving element between the drive shaft and one of the rollers of the roller frame.

8. In a lumber handling device; a drive shaft, an elevator, a roller frame, rollers journaled in the roller frame, a master roller, a countershaft adjacent thereto, intermeshing gears on the countershaft and the master roller shaft, sprocket and chain connections between the rollers, and a flexible connector joined with the drive shaft and adapted to be connected with either them aster roller shaft or the countershaft to drive the rollers in a forward or reverse direction.

9. In a lumber handling device; the roller frame, master rollers and countershafts at each end thereof, rollers adapted to receive a tie disposed therebetween, a supporting carriage, a tie turner trough mounted on the carriage, spiked rollers in the tie turner trough, a flexible connection between one of the master rollers and the roller frame and one of the spiked rollers of the tie turner, and a tilting platform located at the end of the roller frame disposed over the tie turner and adapted to receive a tie preparatory to discharging it into the tie turner.

10. In a lumber handling device; a roller frame, tie forwarding rollers journaled in the frame, a normally horizontal tilting platform pivotally supported at the discharge end of the roller frame, a tie turner disposed beneath the tilting platform, and a platform trip associating with the tilting platform adapted to be operated to release the platform by the weight of the end of a tie.

11. In a lumber handling device; a tie elevator, a roller frame disposed adjacent to the discharge end of the elevator, forwarding roller journaled in the roller frame, a tie turner disposed at the discharge end of the roller frame, standards arranged to support the tie turner, the standards being adapted to be located in a car to be loaded, and extensible brace members associated with the standards adapted to engage the sides of the car to hold the standards immovable.

12. In a lumber handling device; a roller frame, tie forwarding rollers journaled in the roller frame, a tilting platform at the end of the roller, a carriage, a housing having a pivotal connection with the carriage, the housing having flared sides, a tie turner including a trough located in the housing and disposed beneath the tilting platform, forwarding rollers journaled in the trough, a second tilting platform at the discharge end of the trough, and a tie-operated trip for tilting the platform.

13. In a lumber handling device; a tie turner, including a roller trough, tie forwarding rollers journaled in the trough, a housing supporting the trough, and having flared sides, a double and single carriage support for the trough the supports being adapted to be mounted on a railway car, extensible brace members arranged on the supports and adapted to engage the sides of a car, and winding drum devices for adjusting the supports vertically.

14. In a lumber handling device; a double carriage and a single carriage support, adapted to be mounted on a car, rack and pinion operated braces adapted to engage the sides of the car and hold the supports firmly, a double carriage and a single carriage mounted on the double and single carriage supports respectively, a housing having flared sides pivotally mounted on the double carriage, a tie turner trough disposed in the housing and supported at its forward end by the single carriage, and simultaneously operative rack and pinion devices for shifting the double and single carriages laterally of their supports.

JOHN RAYMOND SZYMANSKE.